United States Patent
Heininger et al.

(10) Patent No.: US 8,807,977 B2
(45) Date of Patent: Aug. 19, 2014

(54) CAM FOLLOWER SLIDE FOR MOLD CLAMPING LINKAGE SYSTEM

(75) Inventors: Ammon Heininger, New Freedom, PA (US); Larry M. Taylor, Landisville, PA (US); Marshall M. Miller, Wrightsville, PA (US)

(73) Assignee: Graham Packaging Company, L.P., York, PA (US)

( * ) Notice: Subject to any disclaimer, the term of this patent is extended or adjusted under 35 U.S.C. 154(b) by 989 days.

(21) Appl. No.: 12/897,301

(22) Filed: Oct. 4, 2010

(65) Prior Publication Data
US 2012/0082751 A1 Apr. 5, 2012

(51) Int. Cl.
*B29C 49/56* (2006.01)

(52) U.S. Cl.
USPC ......... 425/107; 425/451.5; 425/540; 425/541

(58) Field of Classification Search
CPC .............................................. B29C 2049/563
USPC .................... 425/107, 451.4, 451.5, 540, 541
See application file for complete search history.

(56) References Cited

U.S. PATENT DOCUMENTS

| | | | |
|---|---|---|---|
| 2,750,625 A | 6/1956 | Colombo | |
| 3,421,886 A | 1/1969 | Schelleng | |
| 3,484,897 A | 12/1969 | Kovacs | |
| 3,571,848 A | 3/1971 | Szajna | |
| 3,589,163 A | 6/1971 | Byrne et al. | |
| 3,764,250 A * | 10/1973 | Waterloo | 425/541 |
| 3,869,237 A | 3/1975 | Hellmer et al. | |
| 3,932,084 A | 1/1976 | Reilly | |
| 4,046,496 A | 9/1977 | Gorin et al. | |
| 4,080,146 A | 3/1978 | Hellmer | |
| 4,161,579 A | 7/1979 | Edelman et al. | |
| 4,419,063 A * | 12/1983 | Heise | 425/107 |
| 4,507,072 A | 3/1985 | Gaul, Jr. | |
| 4,522,608 A | 6/1985 | Joyner | |
| 4,602,810 A | 7/1986 | Babb, Jr. et al. | |

(Continued)

FOREIGN PATENT DOCUMENTS

| | | |
|---|---|---|
| CN | 200977723 | 11/2007 |
| DE | 102005029916 | 3/2007 |

(Continued)

OTHER PUBLICATIONS

International Search Report for International Application No. PCT/US2011/053874 issued by the European Patent Office with a mailing date of Apr. 2, 2013.

(Continued)

*Primary Examiner* — James Mackey
(74) *Attorney, Agent, or Firm* — Stradley Ronon Stevens & Young, LLP

(57) ABSTRACT

A cam follower slide component used in an apparatus for extrusion blow molding polyethylene teraphthalate is disclosed. The cam follower slide component is designed to include disc springs positioned about a spindle that is in turn located along the slide direction of the cam follower. With the inclusion of disc springs, the cam follower slide is capable of absorbing certain excessive forces within the blow mold clamping linkage system that may develop during irregular blow mold process conditions. In a preferred embodiment, the cam follower slide component includes the ability to adjust the spring force of the disc springs to allow for a variation in allowable excess system linkage forces.

17 Claims, 4 Drawing Sheets

(56) References Cited

U.S. PATENT DOCUMENTS

| | | |
|---|---|---|
| 4,606,717 A | 8/1986 | Polak et al. |
| 4,648,831 A | 3/1987 | Johnson |
| 4,755,290 A | 7/1988 | Neuman et al. |
| 4,801,361 A | 1/1989 | Bullard et al. |
| 4,859,397 A | 8/1989 | Peters |
| 4,867,197 A | 9/1989 | Ritter et al. |
| 4,919,607 A | 4/1990 | Martin et al. |
| 4,943,228 A | 7/1990 | Reymann et al. |
| 4,946,366 A | 8/1990 | Dundas et al. |
| 4,984,977 A | 1/1991 | Grimminger et al. |
| 4,998,873 A | 3/1991 | Martin et al. |
| 5,078,948 A | 1/1992 | Troutman et al. |
| 5,551,862 A | 9/1996 | Allred, Jr. |
| 5,565,165 A | 10/1996 | Matsuhashi |
| 5,681,596 A | 10/1997 | Mills et al. |
| 5,698,241 A | 12/1997 | Kitzmiller |
| 5,705,121 A | 1/1998 | Allred, Jr. |
| 5,939,108 A | 8/1999 | Nobuyuki et al. |
| 5,948,346 A | 9/1999 | Mills et al. |
| 6,135,145 A | 10/2000 | Bolling |
| 6,345,973 B1 | 2/2002 | Nielsen |
| 6,352,123 B1 | 3/2002 | Schlegel et al. |
| 6,632,493 B1 | 10/2003 | Hildebrand, IV et al. |
| 6,787,073 B1 | 9/2004 | Tadler et al. |
| 7,611,657 B2 | 11/2009 | Klinedinst et al. |
| 7,766,645 B2 | 8/2010 | Legallais |
| 2006/0290033 A1 | 12/2006 | Purdel |
| 2007/0271761 A1 | 11/2007 | Haytayan |
| 2008/0069915 A1 | 3/2008 | Busse et al. |
| 2009/0085243 A1 | 4/2009 | Taylor et al. |

FOREIGN PATENT DOCUMENTS

| | | |
|---|---|---|
| EP | 1 273 417 A2 | 8/2003 |
| EP | 1 598 165 A1 | 11/2005 |
| EP | 1598165 | 11/2005 |
| EP | 2 008 784 | 12/2008 |
| EP | 2 030 757 | 3/2009 |
| GB | 2125145 | 2/1984 |
| JP | 62170314 | 7/1987 |
| JP | 2004-223816 | 8/2004 |
| JP | 2005-35060 | 2/2005 |
| JP | 2008-87856 | 4/2008 |
| WO | WO9203276 | 3/1992 |
| WO | 01/32388 A1 | 5/2001 |
| WO | 02/072334 | 9/2002 |
| WO | 2005/002742 A1 | 1/2005 |
| WO | WO2009059091 | 5/2009 |

OTHER PUBLICATIONS

International Search Report for International Application No. PCT/US2011/054667 issued by the European Patent Office with a mailing date of Jan. 27, 2012.

International Search Report for International Application No. PCT/US2011/054678 issued by the European Patent Office with a mailing date of Feb. 17, 2012.

* cited by examiner

CAM FOLLOWER SLIDE FOR MOLD CLAMPING LINKAGE SYSTEM

FIELD OF THE INVENTION

The invention generally relates to extrusion blow molding and extrusion blow molding devices. More particularly, the disclosed invention relates to an apparatus for extrusion blow molding polyethylene teraphthalate, and more specifically relates to a cam follower slide component used in an apparatus for extrusion blow molding polyethylene teraphthalate.

BACKGROUND OF THE INVENTION

Polymer resins, such as polyethylene terephthalate (PET), are widely used in the packaging industry. PET is a linear, thermoplastic polyester resin. The advantages of PET include toughness, clarity, good barrier properties, light weight, design flexibility, chemical resistance, and good shelf-life performance. Furthermore, PET is environmentally friendly because it can often be recycled. These characteristics of PET make it a popular material in the manufacturing of containers, for example, beverage bottles.

There are a variety of production methodologies to produce PET containers. For example, injection stretch blow molding is commonly used to make PET bottles. Of the various methodologies, one-piece PET containers having an integrated handle are commonly formed using extrusion blow molding (EBM). The EBM process includes extruding a polymer resin in a softened state through an annular die to form a molten hollow tube or parison. The molten parison is placed in a hollow blow mold having a cavity corresponding to the desired shape of the container being formed. Air is injected to inflate the parison against the interior walls of the blow mold. Upon contact with the walls, the parison cools rapidly and assumes the shape of the mold.

PET manufacturers have developed different grades or versions of PET that are more suitable for use in EBM methods. Such extrusion grade PET or "EPET" has a higher molecular weight that standard PET, and has an inherent viscosity of 1.0 dl/g or greater as measured by solution viscosity. Importantly, the molding forces associated with forming EPET containers are higher than the molding forces developed during the forming of PET containers.

One type of rapid EBM method used to from EPET containers uses a blow mold apparatus that has the capacity of forming approximately 100 containers per minute. This type of blow mold machine may be configured with a rotating vertical wheel such that the wheel is configured with circumferentially spaced mold halves. The mold halves each capture a vertical, continuously growing parison at an extrusion station. In one example blow mold apparatus the flow head extruding the parison moves up and away from the mold halves after the mold halves close to capture the parison. The parison is severed adjacent to the top of the mold halves, the mold halves then move away from the extrusion station, and a top blow pin is moved into the end of the captured parison at the top of the mold halves to seal the mold cavity and blow the parison. The flow head and dependent parison are then lowered back into the initial position so that the new parison is in position to be captured by the next pair of mold halves.

The blown parison cools as the wheel and mold halves rotate. At the appropriate mold ejection station, the mold halves open and the finished container is ejected from between the mold halves. In normal operation, the rotary wheel apparatus is capable of producing approximately 110 containers per minute using a 22 mold machine and a rotation rate of 5 RPM.

EBM processes, and especially those forming EPET containers, often develop very high mold clamp forces. Because the mold clamp forces are transmitted through the system linkages, any weak element or component in the linkage may result in stress failures or deformation in the element. One element in the system linkage that is subjected to such high forces is a cam follower slide. Incorporating an element within the system linkage to absorb certain excess forces that may be transmitting through the linkage system and the two mold halves, in the fashion of a shock absorber, would reduce certain deformations or stress failures in the linkage system. Such deformations could cause increased system fatigue, mold misalignment, or even system failure.

Accordingly, there is a need to incorporate a means to absorb excess forces generated during the EBM process, and thereby reduce linkage deformations or stress failures, and increase system reliability and consistent container results. Such an improvement has not been previously incorporated into such EBM machines, including those forming EPET containers. The inventive cam follower element described below, incorporating spring means, is such an improved system linkage element designed to absorb excess system linkage forces.

SUMMARY OF THE INVENTION

The above noted problems, which are inadequately or incompletely resolved by the prior art are completely addressed and resolved by the invention.

A preferred embodiment of the invention is a cam follower slide device for use in a blow mold clamping linkage system, comprising a cam housing having an internal cavity, said cam housing linked to the blow mold clamping linkage system; a spindle positioned within the cam housing internal cavity; and at least one spring means positioned along the spindle wherein excess load forces within the blow mold clamping linkage system may be absorbed by said at least one spring means. Another embodiment of the invention is a cam follower slide device for use in a blow mold clamping linkage system comprising a cam housing having an internal cavity, said cam housing linked to the blow mold clamping linkage system; a spindle positioned within the cam housing internal cavity; and at least one disc spring positioned along the spindle wherein excess load forces within the blow mold clamping linkage system may be absorbed by said at least one disc spring.

Another preferred embodiment of the invention is a linkage apparatus for use in a blow mold clamping system, comprising blow mold halves movably connected to an actuation component to control opening and closing of said blow mold halves; and a cam follower slide for use in the blow mold clamping linkage system, wherein the cam follower slide comprises a cam housing having an internal cavity, said cam housing linked to the blow mold clamping linkage system; a spindle positioned within the cam housing internal cavity; and at least one spring means positioned along the spindle wherein excess load forces within the blow mold clamping linkage system may be absorbed by said at least one spring means.

Still another preferred embodiment of the invention is a blow mold clamping system, comprising blow mold halves; an actuation component to control the opening and closing of said blow mold halves; and a plurality of linkage components connecting said actuation component to said blow mold halves, wherein one of said linkage components comprises a cam follower slide for use in the blow mold clamping system, wherein the cam follower slide comprises a cam housing having an internal cavity, said cam housing linked to the blow mold clamping linkage system; a spindle positioned within the cam housing internal cavity; and at least one spring means positioned along the spindle wherein excess load forces within the blow mold clamping linkage system may be absorbed by said at least one spring means.

The invention will be best understood by reading the following detailed description of the several disclosed embodiments in conjunction with the attached drawings that are briefly described below.

BRIEF DESCRIPTION OF THE DRAWINGS

The invention is best understood from the following detailed description when read in connection with the accompanying drawings. It is emphasized that, according to common practice, the various features of the several drawings are not to scale, and the invention is not limited to the precise arrangement as may be shown in the accompanying drawings. On the contrary, the dimensions and locations of the various features are arbitrarily expanded or reduced for clarity, unless specifically noted in the attached claims.

DETAILED DESCRIPTION OF PREFERRED EMBODIMENTS

Figure 1:
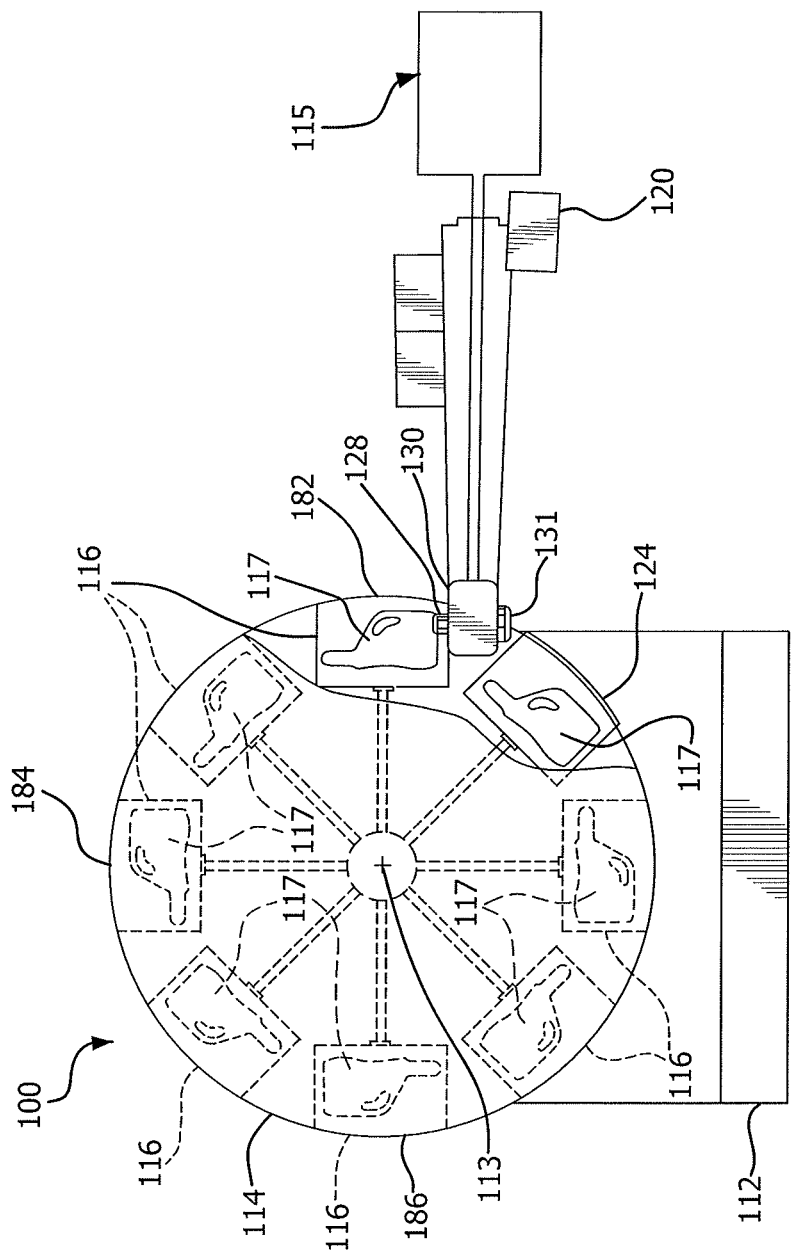
FIG. 1: is a side view illustration of an example vertical rotary blow mold machine.

The invention is a cam follower slide component used in an apparatus for extrusion blow molding PET, and more particularly for blow molding extrusion grade PET, or EPET. The cam follower slide is designed to include a spring component to allow for absorbing of excess linkage forces due to irregular process conditions, and thereby provide increased durability of the linkage elements over prior art blow mold linkage systems. The cam follower slide is an element in vertical wheel-type continuous extrusion blow molding machine. Referring to the drawings, in which like reference numbers refer to like elements throughout the various figures that comprise the drawings, FIG. 1 shows a vertical rotating blow molding machine 100. The machine 100 includes a rotatable wheel 114, supported on a base 112, and an extruder 115.

The wheel 114 has a plurality of in-line molds 116, each mold 116, preferably located at the perimeter of the wheel 114, and having an identical inner cavity 117 defining a container. A typical rotary blow molding machines 100 may have from 6 to 30 molds, but may have any number of molds that fit around the wheel 114. The in-line molds 116 are mounted on the wheel 114, for rotation about a horizontally disposed rotational axis 113. The in-line molds 116 each preferably have a pair of mold halves 116a and 116b, shown in FIG. 2, that split the respective inner cavities 117 and that open and close at various stations during rotation about the rotational axis 113 consistent with operation of a conventional wheel-type extrusion blow molding apparatus.

Figure 2:
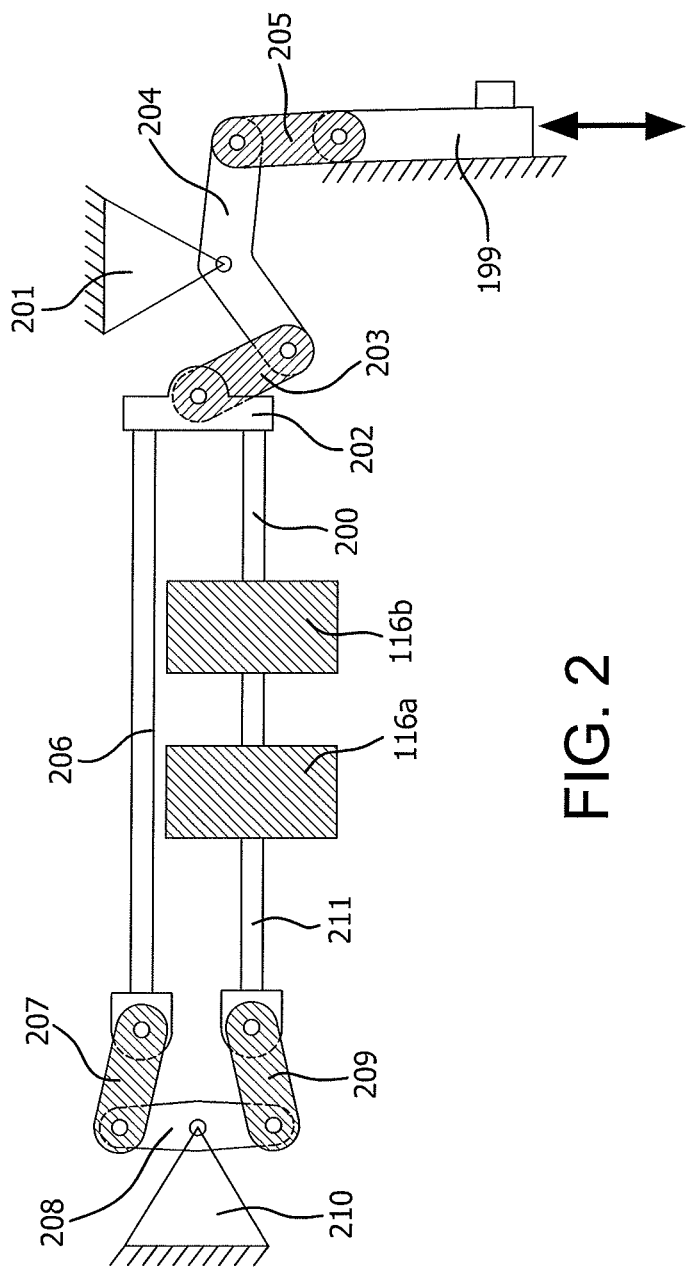
FIG. 2: is a top view illustration of a vertical rotary blow mold machine showing the wheel linkage system components.

FIG. 2 shows, in a preferred embodiment, the elements of the linkage system that may be used in a blow mold machine 100. The mold halves 116a and 116b, shown in FIG. 2 in an open position. The molds 116 are linked to a cam follower 199 via a linkage system. The linkage system includes as primary elements, a pivot bracket 201, a bridge link or yoke 202, an angle link 204, an actuator rod 206, a pivot link 208, and a pivot casting 210. Each of these elements is interconnected to control the opening and closing of the mold halves 116a and 116b as the cam follower 199 moves. More particularly, as shown in FIG. 2, cam follower 199 is connected to angle link 204 via cam link 205. As cam follower 199 moves angle link rotates about pivot bracket 201.

Angle link 204 is connected to bridge link 202 via cam link 203. Because bridge link 202 is connected to mold half 116b by guide rod 200, as bridge link 202 translates left or right, as shown in FIG. 2, mold half 116b also translate left, to close, or right, to open. Bridge link 202 is also connected to transfer or actuator rod 206, which in turn is connected to pivot link 208 via station link 207. Pivot link 208 is rotatably connected to pivot casting 210, and is also connected to compression shaft 211 via station link 209. Finally, compression shaft 211 is connected to the other mold half 116a. Given the rotational and translation interconnections between the linkage system elements, as cam follower 199 translates or moves, the mold halves 116a and 116b open and close as the wheel 114 rotates through the various positions and stations necessary to form a container 10.

Figure 3A:
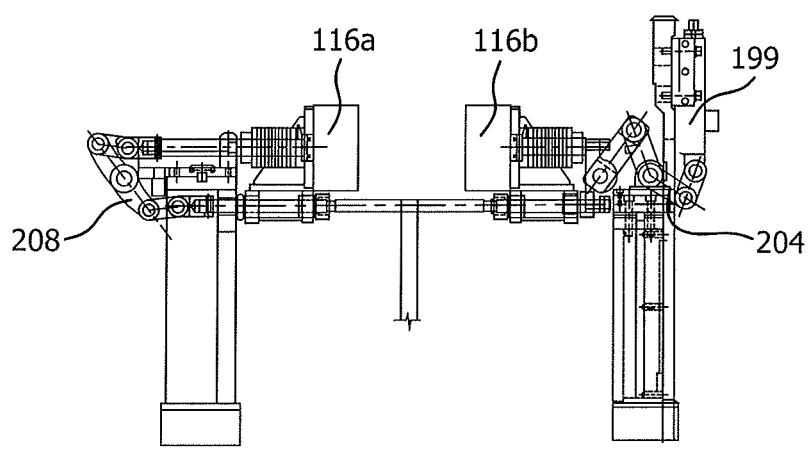
FIG. 3A: is a bottom view illustration of a vertical rotary blow mold machine showing the mold halves in an open position.
Figure 3B:
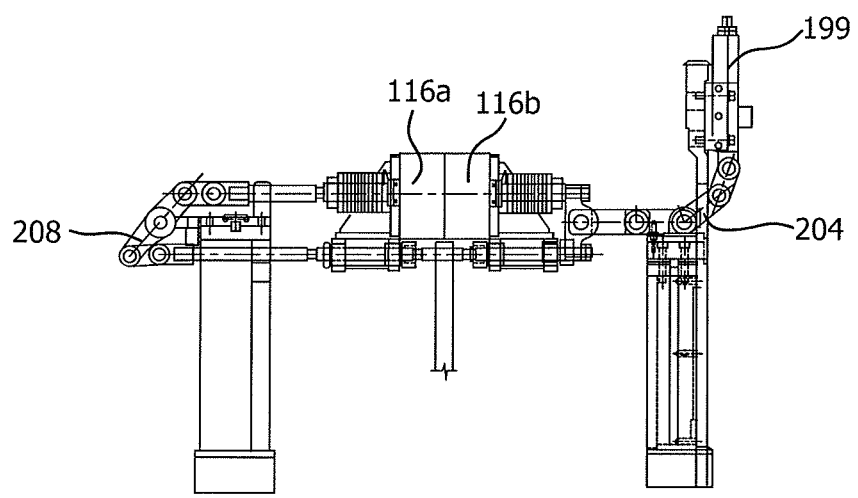
FIG. 3B: is a bottom view illustration of a vertical rotary blow mold machine showing the mold halves in a closed position.

FIGS. 3A and 3B illustrate a different detailed view of the linkage elements that are also show in FIG. 2. In FIG. 3A, the mold halves 116a and 116b are shown in an open configuration, that is after the formed container has been removed and the mold halves are ready to be positioned to form another container. In this configuration, the cam follower 199 is shown on the right hand side, and in a position translated towards the bottom of the figure. In FIG. 3B, the mold halves 116a and 116b are show in a closed configuration. In this closed configuration, the container can be formed through the blow mold process. As compared to FIG. 3A, the cam follower 199, in this mold-closed configuration, is translated towards the top of the figure. The associated rotational movements of the linkage elements, including pivot link 208 and angle link 204 are shown in FIGS. 3A and 3B.

Each of the linkage system elements is designed to operate within certain dimension or geometric tolerances, and to accept certain forces necessary to form a container 10 through the blow mold process. If an element within the linkage system is fatigued or stressed, and such an element may deform or fail, which could then require that the manufacturing process cease to operate. To ensure reliability and continued operation, weak elements in the linkage system should be improved or made more robust. In addition to increasing the strength of the several linkage system elements, the linkage system can also include an element that is capable of absorbing excess loads and forces which may be imparted through the linkage system due to irregular process conditions. Such irregular conditions could include a container or excess material that may be stuck in the mold halves 116a and 116b. Other irregular conditions could be linkage element deformation.

Figure 4:
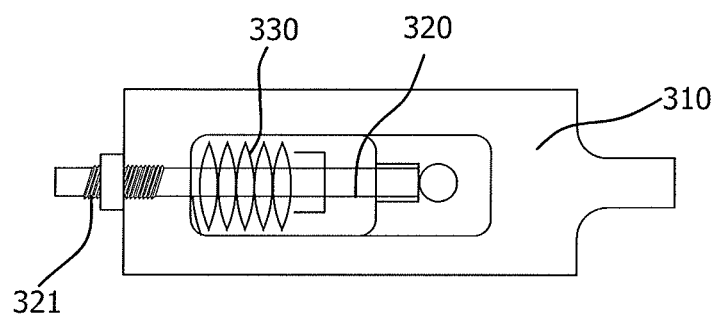
FIG. 4: is a top view illustration of an embodiment of the invention cam follower slide.
Figure 5:
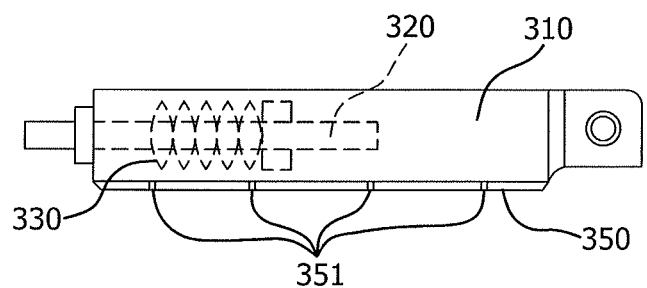
FIG. 5: is a side view illustration of an embodiment of the invention cam follower slide.

As shown in FIGS. 4 and 5, in a preferred embodiment, cam follower or cam follower slide 199 may, in a preferred embodiment, include a cam follower housing 310, along with one or more compression springs 330 that are positioned on or along a spindle 320. FIG. 4 shows a top view of a cam follower slide 199, while FIG. 5 shows an illustrated side-view of a cam follower slide 199. The spindle 320 extends within and has limited movement within the cam follower housing 310 such that when excess forces within the linkage system translated back to the cam follower slide 199, the cam housing is capable of slight translation movement along the spindle 320. With the inclusion of one or more compression springs 330, as shown in FIGS. 4 and 5, the movement is and excess forces are absorbed by the springs. Accordingly, in the described preferred embodiment, the excess forces would be absorbed within the compression springs 330 and would permit slight movement of the cam follower 199, thereby preventing fatigue, deformation or failure of other linkage system elements.

As shown in FIGS. 4 and 5, the compression springs 330 can be a plurality of disc springs. Other spring configurations could also be used in other embodiments, so long as the spring compression forces are adequate to absorb the excess forces that may be generated during the blow mold process. In a further preferred embodiment, compression springs 330 may be adjustable to permit variation of forces that can be absorbed by the cam follower slide. Such an adjustment could be accomplished by making the spindle 320 threaded, as shown in FIG. 4, with threads 321. The threaded spindle 320 could then be positioned within the cam follower housing 310 to pre-compress or load the springs 330, and thereby provide a reduced allowable movement of the cam follower slide 199 due to excess linkage forces.

FIGS. 3A and 3B show the range of translation motion of the cam follower slide 199 as the mold halves 116a and 116b are in an open and closed position. With the movement of the cam follower slide 199, a wear strip or wear element 350 may be included on the bottom of cam follower housing 310. The wear strip 350 is designed to reduce friction or excessive wear of the cam housing as the cam follower slide 199 translates during the mold process. In a particular preferred embodiment, a lubricant, such as grease could be applied to the wear strip 350 through fittings 351 included in the cam follower housing 310.

The above detailed description teaches certain preferred embodiments of the inventive cam follower slide used within a blow mold linkage system. As described, the inventive cam follower slide with compression springs provides the ability to absorb excess forces generated in the system linkage due to irregular process conditions. While preferred embodiments of the cam follower slide have been described and disclosed, it will be recognized by those skilled in the art that various modifications and/or substitutions are possible. All such modifications and substitutions are intended to be within the true scope and spirit of the invention as disclosed. It is likewise understood that the attached claims are intended to cover all such modifications and/or substitutions.

What is claimed is:

1. A cam follower slide device for use in a blow mold clamping linkage system, comprising:
    a cam housing having an internal cavity, a first end, a second end, and a bottom, said cam housing having the first end linked to the blow mold clamping linkage system;
    a spindle positioned within the cam housing internal cavity and extending through the second end whereby said spindle is capable of translation movement within the cam housing; and
    at least one spring component positioned along the spindle wherein excess load forces within the blow mold clamping linkage system may be absorbed by said at least one spring component, and wherein the cam housing is configured to be linked to the blow mold clamping linkage system via a cam link and an angle link, the cam link connecting to an outermost end of the angle link.

2. The cam follower slide device, as provided in claim 1, wherein the at least one spring component is a plurality of disc springs.

3. The cam follower slide device, as provided in claim 1, wherein the spindle is partially threaded.

4. The cam follower slide device, as provided in claim 1, further comprising a wear element on the bottom of the cam housing.

5. The cam follower slide device, as provided in claim 4, further comprising a fitting to permit applying a lubricant to the cam housing wear element.

6. The cam follower slide device, as provided in claim 1, wherein a spring force of the at least one spring component is adjustable by an adjustment means on said cam housing.

7. A linkage apparatus for use in a blow mold clamping linkage system, comprising:
    blow mold halves movably connected to an actuation component to control opening and closing of said blow mold halves; and
    a cam follower slide linked to the actuation component, wherein the cam follower slide comprises a cam housing having an internal cavity, a first end, a second end, and a bottom, said cam housing having the first end linked to the actuation component; a spindle positioned within the cam housing internal cavity and extending through the second end whereby said spindle is capable of translation movement within the cam housing; and at least one spring component positioned along the spindle wherein excess load forces within the blow mold clamping linkage system may be absorbed by said at least one spring component, and wherein the cam housing is linked to the actuation component via a cam link and an angle link, the cam link connected to an outermost end of the angle link.

8. The linkage apparatus for use in a blow mold clamping system, as provided in claim 7, wherein the at least one spring component is a plurality of disc springs.

9. The linkage apparatus for use in a blow mold clamping system, as provided in claim 7, further comprising a wear element on the bottom of the cam housing.

10. The linkage apparatus for use in a blow mold clamping system, as provided in claim 9, further comprising a fitting to permit applying a lubricant to the cam housing wear element.

11. The linkage apparatus for use in a blow mold clamping system, as provided in claim 7, wherein a spring force of the at least one spring component is adjustable by an adjustment means on said cam housing.

12. A blow mold clamping linkage system, comprising:
    blow mold halves;
    an actuation component to control the opening and closing of said blow mold halves; and
    a plurality of linkage components connecting said actuation component to said blow mold halves, wherein one of said linkage components comprises a cam follower slide linked to the actuation component, wherein the cam follower slide comprises a cam housing having an internal cavity, a first end, a second end, and a bottom, said cam housing having the first end linked to the actuation component; a spindle positioned within the cam housing internal cavity and extending through the second end whereby said spindle is capable of translation movement within the cam housing; and at least one spring component positioned along the spindle wherein excess load forces within the blow mold clamping linkage system may be absorbed by said at least one spring component, and wherein the cam housing is linked to the actuation component via a cam link and an angle link, the cam link connected to an outermost end of the angle link.

13. The blow mold clamping system, as provided in claim 12, wherein the at least one spring component is a plurality of disc springs.

14. The blow mold clamping system, as provided in claim 12, further comprising a wear element on the bottom of the cam housing.

15. The blow mold clamping system, as provided in claim 14, further comprising a fitting to permit applying a lubricant to the cam housing wear element.

16. The blow mold clamping system, as provided in claim 12, wherein a spring force of the at least one spring component is adjustable by an adjustment means on said cam housing.

17. The blow mold clamping system, as provided in claim 12, wherein the angle link comprises an angle with a connection to a pivot bracket.

* * * * *